(12) United States Patent
De Vriendt et al.

(10) Patent No.: US 6,795,436 B1
(45) Date of Patent: Sep. 21, 2004

(54) METHOD TO GENERATE DATA CELLS, DATA CELL GENERATING ARRANGEMENT, AND DATA CELL RECEIVING ARRANGEMENT

(75) Inventors: Johan De Vriendt, Afsnee (BE); Guido Henri Marguerite Petit, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/468,228

(22) Filed: Dec. 20, 1999

(30) Foreign Application Priority Data

Dec. 23, 1998 (EP) .......................................... 98403294

(51) Int. Cl.⁷ .......................... H04L 12/28; H04L 12/56
(52) U.S. Cl. .................................. 370/395.1; 370/537
(58) Field of Search ........................ 370/395.1, 395.2, 370/395.3, 395.51, 395.6, 395.61, 395.7, 420, 465, 471, 475, 470, 230, 231, 236.2, 537, 536, 399, 241.1, 473, 476, 252, 477, 240, 394, 395.64, 442, 522

(56) References Cited

U.S. PATENT DOCUMENTS

| | | | |
|---|---|---|---|
| 5,822,321 A | | 10/1998 | Petersen et al. |
| 5,978,375 A | * | 11/1999 | Petersen et al. ......... 370/395.6 |
| 6,341,131 B1 | * | 1/2002 | Eneroth et al. ........ 370/395.61 |
| 6,434,151 B1 | * | 8/2002 | Caves et al. ............. 370/395.2 |
| 6,449,276 B1 | * | 9/2002 | Subbiah et al. ......... 370/395.6 |
| 6,563,827 B1 | * | 5/2003 | Brueckheimer et al. . 370/395.1 |
| 6,590,909 B1 | * | 7/2003 | Stacey et al. ............... 370/537 |
| 6,600,746 B1 | * | 7/2003 | Petersen ..................... 370/394 |
| 6,631,116 B1 | * | 10/2003 | Eneroth et al. .......... 370/236.2 |
| 6,661,796 B1 | * | 12/2003 | Takashima et al. ...... 370/395.1 |

FOREIGN PATENT DOCUMENTS

| | | |
|---|---|---|
| EP | 0 601 766 A1 | 6/1994 |
| EP | 0 858 240 A2 | 8/1998 |

OTHER PUBLICATIONS

B. Subbiath et al, "ATM adaptation layer (AAL2) for low bit rate speech and data: issues and challenges", 1998 IEEE ATM Workshop Proceedings. Meeting the Challenges of Deploying the Global Broadband Network Infrastructure, Cat. No. 98EX164), 1998 IEEE ATM Workshop Proceedings, pp. 225–233 XP002104243.

ITU–T Recommendation I. Trunk, "AAL Type 2 Service Specific Convergence Sublayer (SSCS) for Trunking", Sep. 1997.

* cited by examiner

*Primary Examiner*—Dang Ton
*Assistant Examiner*—Phuc Tran
(74) *Attorney, Agent, or Firm*—Sughrue Mion, PLLC

(57) ABSTRACT

A data cell generator multiplexes a plurality of data/speech packets (P1, P2, P3) into a single minicell (MC1'), for instance an Asynchronous Transfer Mode Adaptation Layer minicell, and adds overhead information (OH) to the minicell (MC1') indicative for the lengths of the data/speech packets (P1, P2, P3) multiplexed therein. Several minicells (MC1', MC2', MC3', MC4') thereafter are multiplexed into a data cell (ATM_C), for instance an Asynchronous Transfer Mode) cell.

9 Claims, 2 Drawing Sheets

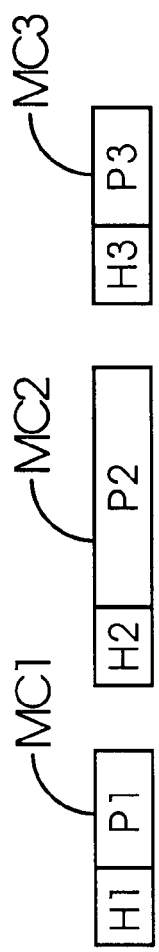
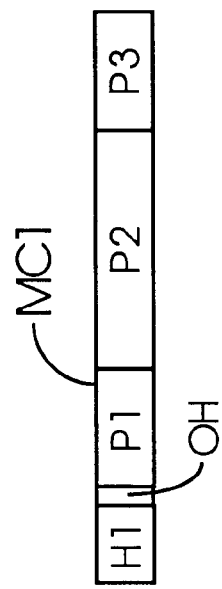

METHOD TO GENERATE DATA CELLS, DATA CELL GENERATING ARRANGEMENT, AND DATA CELL RECEIVING ARRANGEMENT

BACKGROUND OF INVENTION

The present invention relates to a method to generate a data cell in a telecommunication system by multiplexing a plurality of minicells into the data cell, a data cell generating arrangement able to perform this method, a data cell receiving arrangement able to communicate with the data cell generating arrangement, and a telecommunication system including such data cell generating and receiving arrangements.

Such a method to generate a data cell and related equipment are already known in the art, e.g. from working text for the planned ITU-T Recommendation I.TRUNK, entitled *'AAL Type 2 Service Specific Convergence Sublayer (SSCS) for Trunking*, published in September 1997. Indeed, ATM (Asynchronous Transfer Mode) is a well-known protocol used in telecommunication systems that is based on transmission of data in fixed size cells, the so called ATM cells. Such an ATM cell has a length of 53 octets or 53 bytes: 5 bytes form the ATM cell header whereas the remaining 48 bytes constitute a payload section that can be filled with the data to be transferred. For low bit rate applications, bandwidth utilisation of ATM can be improved by incorporation of an additional layer, the so called ATM Adaptation Layer. The ATM Adaptation Layer is based on encapsulation of data in minicells which afterwards are multiplexed in an ATM cell. The ATM Adaptation Layer can be subdivided into two parts: one or more service specific convergence sublayers (SSCS) and a common part sublayer (CPS). The service specific convergence sublayer (SSCS) serves as an interface between a telecommunication service, for instance a mobile telephony service, and the common part sublayer (CPS). Its task is to segment incoming information into packets that can be embedded in an ATM Adaptation Layer minicell. The common part sublayer (CPS) on the other hand inserts each packet in an ATM Adaptation Layer minicell, adds a 3 bytes minicell header to each minicell, and inserts the minicells in an ATM cell. The current invention is in fact dealing with the service specific convergence sublayer (SSCS). In the cited ITU-T working text, it is proposed to apply in the service specific convergence sublayer (SSCS) each speech packet separately to the common part sublayer (CPS) so that each speech packet is embedded in a separate minicell. This means that, in accordance with the known method, a minicell contains a complete data or speech packet. In narrowband applications, such as speech transmission, this known method inefficiently uses the available bandwidth capacity because of the relatively high overhead/payload ratio when applying the method of the cited ITU-T working text. Indeed, speech data packets or speech frames typically have lengths of 10 or 20 bytes. ATM Adaptation Layer minicells have a header of 3 bytes. As a consequence, in the best situation, speech frames of 20 bytes each occupy 1 minicell with a total length of 23 bytes still resulting in minicells with 15 percent overhead. This overhead percentage increases dramatically if shorter data or speech packets are inserted in minicells. Concluding, network efficiency is low if the known method is used for inserting data packets or speech packets into minicells.

SUMMARY OF THE INVENTION

It is therefore an object of the present invention to provide a method for generating data cells and related equipment but which allow to increase network efficiency in terms of bandwidth utilisation significantly.

According to the invention, this object is realised by the method for generating data cells defined by claim 1, the data cell generating arrangement defined by claim 2, the data cell receiving arrangement defined by claim 8, and the telecommunication system defined by claim 9.

Indeed, by concatenating several data or speech packets into a single minicell, the relatively large header of this minicell is shared amongst the different data or speech packets. The share of user data on the link increases whilst the share of overhead data decreases and consequently, the network efficiency improves. To enable the receiving entity to decompose a received minicell and to extract the different data or speech packets therefrom, some additional information indicative for the length of the different packets has to be added to the minicells. This overhead to be added to indicate the length of the multiplexed packets is neglectible in comparison with the overhead that is introduced in the prior art system by embedding each packet in a separate minicell.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the data cell generating arrangement according to the present invention is defined in claim 3.

Indeed, if the data or speech packets that will be multiplexed into minicells can have $2^N$ different lengths which are well known in advance by the transmitting entity and the receiving entity, then the lengths of the multiplexed packets can be communicated from the transmitting entity to the receiving entity via a code of N bits per multiplexed packet. If for example 3 data packets are multiplexed into a minicell and it is supposed that data packets can have 4 different lengths, then a 2 bit code is sufficient to indicate the length of a single packet, and the transmitting entity consequently has to add 6 bits of overhead information to the minicell.

An alternative embodiment of the data cell generating arrangement which is also able to indicate the presence of empty data or speech packets, is defined by claim 4.

Indeed, via a code of N bits, the length the multiplexed packets can be indicated provided that the packets can only have $2^N-1$ different lengths or are empty. In fact, an empty packet is a packet with a length of 0 bytes so that the embodiment defined by claim 4 can be seen as a specialisation of the embodiment of claim 3 wherein one of the predefined packet lengths equals 0 bytes.

A further advantageous feature of the data cell generating arrangement according to the present invention is defined in claim 5.

Indeed, only complete bytes can be transferred in conventional telecom systems. If the number of overhead bits indicative for the lengths of the concatenated packets is not a multiple of 8, either padding bits may be added to the overhead section or alternatively some bits used for error protection of the packet length indicating bits in the data cell receiving arrangement where the data cell generating arrangement communicates with, may be added to fill the incomplete bytes.

Another additional feature of the data cell generating arrangement according to the present invention is defined by claim 6.

Thus, data packets with different origins and different destinations which have to be transferred over one and the same link somewhere in the network, may be multiplexed according to the present invention into a single minicell so that the available link capacity is not only used in an optimal way by the different users individually but is also efficiently used in a multiplexed way between the different users. What is described here is another way of grouping speech packets. Normally however, speech packets belonging to one connection will be concatenated in one minicell if the present invention is applied.

Furthermore, as is indicated by claim 7, the present invention is very suitable for implementation in an ATM (Asynchronous Transfer Mode) based environment wherein an AAL (ATM Adaptation Layer) is incorporated.

BRIEF DESCRIPTION OF THE DRAWING

The above mentioned and other objects and features of the invention will become more apparent and the invention itself will be best understood by referring to the following description of an embodiment taken in conjunction with the accompanying drawings wherein:

FIG. 1A is a drawing illustrating the insertion of data/speech packets P1, P2, P3 into minicells MC1, MC2, MC3 according to the known method;

FIG. 1B is a drawing illustrating the insertion of data/speech packets P1, P2, P3 into a minicell MC1 according to the present invention;

DETAILED DESCRIPTION OF THE INVENTION

Figure 2:
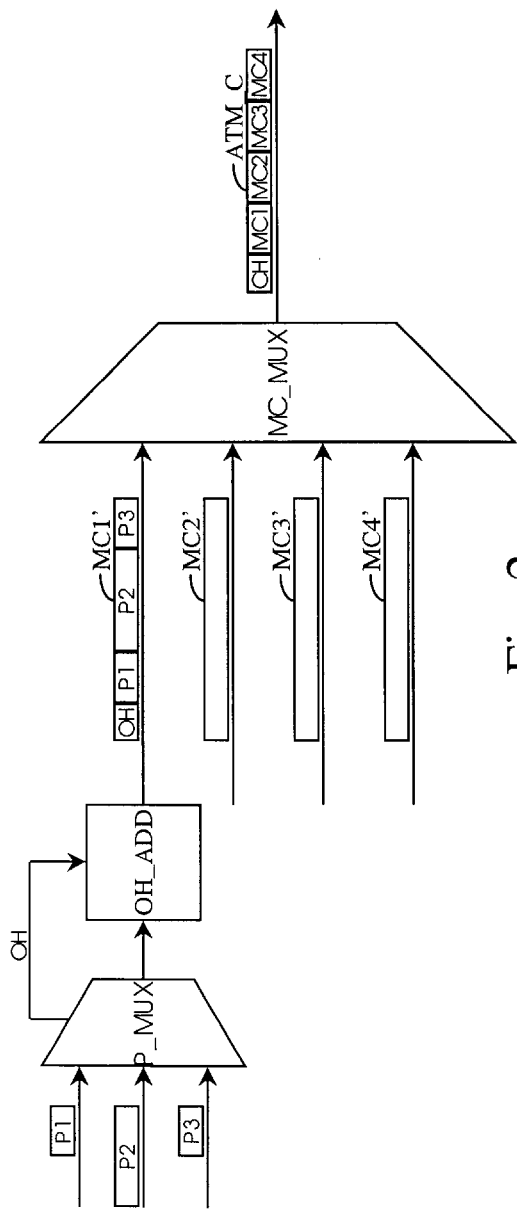
FIG. 2 is a functional block scheme of an embodiment of the data cell generating arrangement according to the present invention.

To explain in detail the current invention, an ATM (Asynchronous Transfer Mode) network will be considered wherein a very cost-effective voice service, i.e. at a very low network cost but possibly with a lower speech quality due to larger delay, is provided. In such a network, a customer for instance can make a choice between a good speech quality service at the normal price or a less good speech quality service at a reduced price. The core ATM network can be optimised by incorporation of voice codecs at the edges of this network which encode the 64 kbps PCM (Pulse Code Modulation) stream into lower bit rate streams of for instance 8 kbps. In addition to this bit rate reduction, the average bit rate can be further reduced by using silence suppression, meaning that during silent periods no or very limited information is transferred. It is supposed that the speech packets P1, P2 and P3 of such a low bit rate voice service have to be transferred between a sending entity and a receiving entity. This sending entity and receiving entity should be considered as ATM network nodes between whom all considered speech packets, P1, P2 and P3, have to be transferred. The sending and receiving entity are not necessarily the originating terminal and destination terminal of the speech packets P1, P2 and P3. In fact, the speech packets P1, P2 and P3 may even originate from different originating terminals and may be destined to different destination terminals. In the ATM network that is considered, the ATM Adaptation Layer 2 is incorporated which implies that user data packets and speech packets are inserted in minicells with possibly different lengths, each having a header of 3 bytes, and that these minicells are multiplexed into the 48 byte long ATM cell payload sections. The speech packets P1, P2 and P3 that have to be transferred between the sending entity and receiving entity may have three different lengths: 10 bytes, 20 bytes or 0 bytes. Speech packets with 0 bytes are so called silent frames transferred during silent periods. In all figures, FIG. 1A, FIG. 1B, FIG. 2 and FIG. 3, it is supposed that speech packet P1 has a length of 10 bytes, speech packet P2 has a length of 20 bytes and speech packet P3 has a length of 10 bytes. If these speech packets would be transferred in accordance with the known method, then the first packet P1 would be inserted in a first minicell MC1 having a first three byte header H1, the second packet P2 would be inserted into a second minicell MC2 having a second three byte header H2, and the third packet P3 would be inserted into a third minicell MC3 having a third three byte header H3. As is illustrated by FIG. 1A, the known method would involve transmission of 49 bytes (10 bytes for P1, 20 bytes for P2, 10 bytes for P3, and 3 headers of 3 bytes) from the sending entity to the receiving entity. If the three speech packets P1, P2 and P3 are transferred in accordance with the present invention, then only a single minicell MC1 including the three speech packets P1, P2 and P3 and having a three byte header Hi has to be transferred between the sending and receiving entity. As is illustrated by FIG. 1B, only 44 bytes would be transferred (10 bytes for P1, 20 bytes for P2, 10, bytes for P3, 1 header of 3 bytes and an additional overhead section OH of 1 byte) then. To enable the receiving entity to extract the speech packets P1, P2 and P3 correctly from the minicell MC1 wherein they are multiplexed, some additional overhead OH has to be transferred from the sending entity to the receiving entity. This additional overhead is indicative for the lengths of the speech packets P1, P2 and P3, and can be kept short in comparison with the headers H2 and H3 of the additional minicells MC2 and MC3 that have to be transferred in the prior art method. Arrangements that can be used in the sending and receiving entity to realise a transmission of the speech packets P1, P2 and P3 as illustrated by FIG. 1B are drawn in FIG. 2 and FIG. 3 respectively.

The ATM cell generating arrangement drawn in FIG. 2 includes a packet multiplexer P_MUX, an overhead adder OH_ADD, and an AAL2 minicell multiplexer MC_MUX. The packet multiplexer P_MUX and the overhead adder OH_ADD are cascade connected between three input terminals of the arrangement and a first input terminal of the AAL2 minicell multiplexer MC_MUX. Furthermore, a control output of the packet multiplexer P_MUX is interconnected with a control input of the overhead adder OH_ADD. Cascade couplings of a packet multiplexer and an overhead adder, similar to the cascade coupling of P_MUX and OH_ADD, are coupled to three additional input terminals of the AAL2 minicell multiplexer MC_MUX but are not drawn in FIG. 2 to avoid overloading the figure. The AAL2 minicell multiplexer MC_MUX in addition to its four input terminals also has an output terminal which serves as an output terminal for the whole arrangement.

For the explanation of the working of the arrangement of FIG. 2 it is supposed that the three speech packets P1, P2 and P3 of FIG. 1A and FIG. 1B are supplied to the three input terminals of the ATM cell generating arrangement of FIG. 2. The first speech packet P1 has a length of 10 bytes, the second speech packet P2 has a length of 20 bytes and the third speech packet P3 has a length of 10 bytes, and these speech packets are supposed to contain information originating from different users and destined for different users. The three speech packets P1, P2 and P3, somewhere in the telecommunication system have to be transferred over one and the same ATM (Asynchronous Transfer Mode) link between a sending entity equipped with the ATM cell generating arrangement of FIG. 2 and a receiving entity equipped with the ATM cell receiving arrangement of FIG. 3. The latter arrangement will be described in detail later on. The packet multiplexer P_MUX of FIG. 2 thus receives the three speech packets P1, P2 and P3 respectively at its first, second and third input terminal. The packet multiplexer P_MUX determines the lengths of the three speech packets P1, P2 and P3, and informs the overhead adder OH_ADD via information sent over the link between the control output of the packet multiplexer P_MUX and the control input of the overhead adder OH_ADD that speech packet P1 has a length of 10 bytes, speech packet P2 has a length of 20 bytes and speech packet P3 has a length of 10 bytes. The format wherein this information is communicated between the packet multiplexer P_MUX and the overhead adder OH_ADD is of no importance with respect to the present invention. Besides informing the overhead adder OH_ADD of the lengths of the received speech packets P1, P2 and P3, the packet multiplexer P_MUX concatenates the three speech packets P1, P2 and P3 and applies the concatenated packet as one data packet of 40 bytes to the overhead adder OH_ADD. Upon receipt of this data packet, the overhead adder OH_ADD adds an overhead section OH indicative for the length of the three packets P1, P2 and P3 to the data packet of 40 bytes. In this way, a first headerless minicell MC1' is generated. If it is assumed that speech packets in the telecommunication system where the arrangement of FIG. 2 is used in, may have lengths of 0 bytes, 10 bytes or 20 bytes, the overhead adder OH can indicate via a 2-bit code the length of each speech packet. The overhead adder OH_ADD for example indicates that the length of a speech packet is 0 bytes via the code 00, indicates that the length of a speech packet is 10 bytes via the code 01, and indicates that the length of a speech packet is 20 bytes via the code 10. The overhead section OH inserted by the overhead adder OH_ADD in the headerless minicell MC1' to indicate that the first speech packet P1 has a length of 10 bytes, the second speech packet P2 has a length of 20 bytes and the third speech packet P3 has a length of 10 bytes is equal to 011001. The use of such a code to indicate the length of multiplexed packets evidently requires that the receiving entity is aware of this code. By multiplexing the speech packets P1, P2 and P3 in the packet multiplexer P_MUX and by adding 6 bits of overhead information in the overhead adder OH_ADD, it is avoided that the three minicells of FIG. 1A, each having a 3 byte header, have to be transferred between the transmitting entity and receiving entity: instead of 49 bytes, 44 bytes are to be transferred which is a significant reduction. It is noted that only complete bytes can be transferred. So, for the remaining two bits, two options are open, i.e. use these two bits for header (OH) protection or use some padding bits. In the last case, it is of course possible to concatenate 4 speech packets instead of 3 in order to further increase efficiency.

Whereas the packet multiplexer P_MUX and the overhead adder OH_ADD perform the functionality of the service specific convergence sublayer (SSCS) of the AAL2 layer, the AAL2 minicell multiplexer MC_MUX performs the functionality of the common part sublayer (CPS) of the AAL2 layer. The AAL2 minicell multiplexer MC_MUX hence performs traditional AAL2 CP (common part) functionality. A minicell header is added to the headerless minicells MC1', MC2', MC3' and MC4', the different minicells MC1, MC2, MC3 and MC4 are multiplexed into the 48 byte payload section of a single ATM cell ATM_C and an ATM cell header of 5 bytes is added to the cell ATM_C. The so generated ATM cell ATM_C is sent over an ATM link towards the ATM cell receiving arrangement drawn in FIG. 3.

Figure 3:
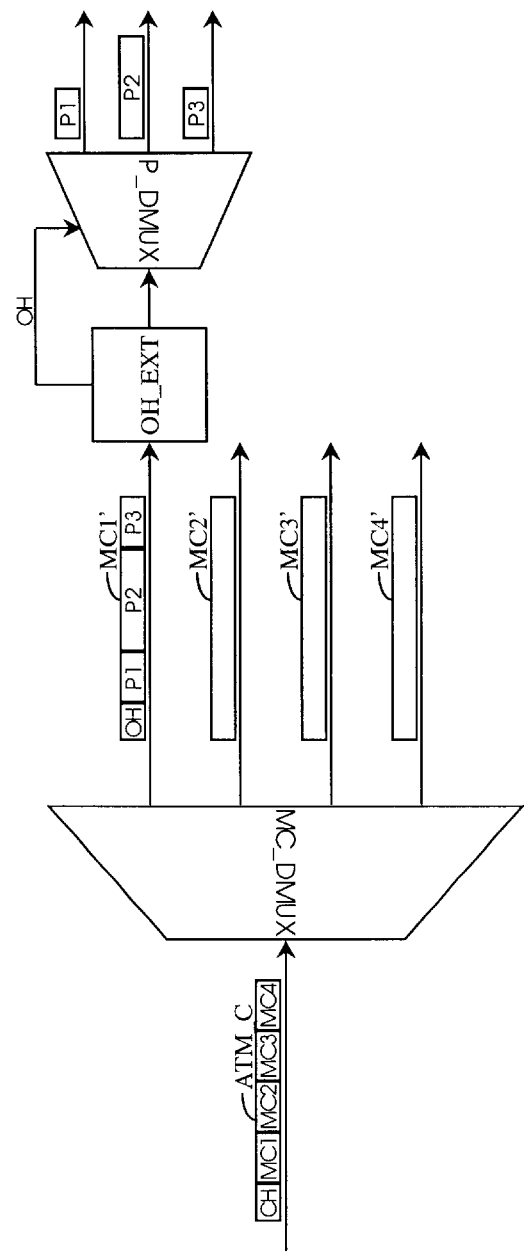
FIG. 3 is a functional block scheme of an embodiment of the data cell receiving arrangement according to the present invention.

The ATM cell receiving arrangement of FIG. 3 includes a minicell demultiplexer MC_DMUX, an overhead extractor OH_EXT and a packet demultiplexer P_DMUX. The input terminal of the ATM cell receiving arrangement and the input terminal of the minicell demultiplexer MC_DMUX are interconnected. The minicell demultiplexer MC_DMUX further has four output terminals whereto similar arrangements are coupled. To avoid overloading the figure only the arrangement coupled to the first output terminal of the minicell demultiplexer MC_DMUX is shown in FIG. 3. This arrangement is constituted by the cascade coupling of the overhead extractor OH_EXT and the packet demultiplexer P_DMUX. The packet demultiplexer P_DMUX further has three outputs, and a control input interconnected with a control output of the overhead extractor OH_EXT.

As is shown in FIG. 3, the ATM cell receiving arrangement of FIG. 3 is able to receive the ATM cell ATM_C generated by the ATM cell generator of FIG. 2 and is able to extract from this ATM cell ATM_C the speech packets P1, P2 and P3 that were inserted therein by the cell generating arrangement of FIG. 2. The minicell demultiplexer MC_DMUX thereto demultiplexes the payload section of the ATM cell ATM_C to thereby extract the four minicells MC1, MC2, MC3 and MC4 embedded therein and subtracts the minicell headers therefrom. The so generated four headerless minicells MC1', MC2', MC3' and MC4' are sourced respectively via the four output terminals of the minicell demultiplexer MC_DMUX. The first headerless minicell MC1' in this way is supplied to the overhead extractor OH_EXT which extracts the overhead section OH from the headerless minicell MC1' and decodes the contents of this overhead section OH into information that indicates to the packet demultiplexer P_DMUX the lengths of the packets carried by the headerless minicell MC1'. The overhead extractor EXT in other words extracts the six bits 011001 that constitute the overhead section OH from the headerless minicell MC1' and thereupon informs the packet demultiplexer P_DMUX via the control link between them that the headerless minicell MC1' contains three packets P1, P2 and P3 with a length of respectively 10 bytes, 20 bytes and 10 bytes. The packet demultiplexer P_DMUX uses this information to correctly demultiplex the packets P1, P2 and P3 carried by the headerless minicell MC1' and sources the three packets P1, P2 and P3 via respectively its first, second and third output terminal. In the ATM cell receiving arrangement drawn in FIG. 3, the minicell demultiplexer MC_DMUX performs the functionality of the AAL2 common part sublayer (CPS) in a traditional way, whereas the overhead extractor OH_EXT and the packet demultiplexer P_DMUX perform the functionality of the AAL2 service specific convergence sublayer (SSCS) in accordance with the present invention.

Summarising, in the above given example, the network efficiency for the transmission of three speech packets is improved from 49 bytes to 44 bytes by concatenating the speech packets P1, P2 and P3 into a single minicell MC1 which allows the AAL (ATM Adaptation Layer) overhead to be shared over different speech packets. Some additional in-band signalling OH, the 6 overhead bits for length information and 2 bits for error protection, is required to indicate the length of the speech packets P1, P2 and P3. This overhead OH however is kept low. The increased network efficiency allows the operator to offer a service at a lower cost. The price to be paid for this increased network efficiency is some additional processing in the service specific convergence sublayer (SSCS) of the ATM Adaptation Layer to packetise and depacketise the speech packets, and to restore the timing. As a result of this additional processing, the overall delay will be slightly increased.

It is to be noticed that in the above described embodiment of the invention, the use of ATM cells and AAL2 minicells is only given as an example. A person skilled in the art of communication networks will appreciate that the basic idea of this invention, i.e. multiplexing user data packets in minicells to increase network efficiency in particular for low bit rate services, is applicable in any cell based telecommunication system wherein a sublayer of minicells is incorporated.

Similarly, it is remarked that the lengths of the speech frames, the lengths of the minicells and their overhead sections, and the lengths of the codes used to indicate the lengths of the multiplexed speech packets are only given by way of example. Any skilled person will be able to adopt the above described embodiment so that it can be integrated in a telecommunication system wherein packets, minicells and cells with other dimensions and other overhead sections are transmitted.

Another important remark is that the scope of the present invention is not limited to the precise structure of the example cell generating and cell receiving arrangements described above and shown in FIG. 2 and FIG. 3. In particular, the way wherein the overhead section OH is added to and subtracted from the minicell MC1 can be changed easily without departing from the basic concept of the present invention. The overhead adder OH_ADD for example may be integrated within the packet multiplexer P_MUX, thus avoiding that the packet multiplexer P_MUX has to send signals indicating the length of the packets P1, P2 and P3 via a control link to the overhead adder OH_ADD. Similarly, the overhead extractor OH_EXT in the cell receiving arrangement may be integrated with the packet demultiplexer P_DMUX hence avoiding that packet length information has to be communicated via a control link between the units OH_EXT and P_DMUX of FIG. 3. The means OH_ADD foreseen to add the overhead section OH to the headerless minicell MC1' may be the means which also adds the standard minicell header to the headerless minicell MC1'. In other words, various ways can be thought off to add the overhead section OH with packet length information to the headerless minicell MC1', and the present invention is not limited to any particular way wherein this is done.

Yet another remark is that the applicability of the invention is not reduced to telecommunication systems with a particular physical transmission medium or wherein any particular physical layer transmission protocol is used. The invention in other words can be applied in any cell-based transmission system, irrespective of the fact whether the cells are sent over twisted pair cables, coaxial cables, optical fibres, radio links, satellite links, or the like, and irrespective of the physical layer protocol (e.g. ADSL—Asymmetric Digital Subscriber Line) that is used to represent the bits on the transmission link.

Furthermore, it is remarked that an embodiment of the present invention is described above in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. A method of generating a data cell in a telecommunication system, said method comprising:
    multiplexing a plurality of data or speech packets in one minicell of a plurality of minicells;
    adding to said one minicell overhead information indicative individual lengths of said data or speech packets multiplexed therein; and
    multiplexing said plurality of minicells into said data cell.

2. A data cell generating arrangement for generating a data cell in a telecommunication system, said data cell generating arrangement comprising.
    packet multiplexing means configured to multiplex a plurality of data or speech packets in at least one minicell of a plurality of minicells;
    overhead adding means coupled to an output of said packet multiplexing means to add to said at least one minicell overhead information indicative of individual lengths of said data or speech packets multiplexed therein; and
    minicell multiplexing means coupled to an output of said overhead adding means and configured to multiplex said plurality of minicells into said data cell.

3. The data cell generating arrangement according to claim 2,
    wherein said overhead adding means is adapted to add N overhead bits to said minicell for each data or speech packet multiplexed into said minicell, N being an integer value chosen so that data/speech packets can have $2^N$ different lengths.

4. The data cell generating arrangement according to claim 2, wherein said overhead adding means (OH_ADD) is adapted to add N overhead bits to said minicell for each data or speech packet multiplexed into said minicell, N being an integer value chosen so that data/speech packets can be empty or have $2^N-1$ different lengths.

5. The data cell generating arrangement according to claim 3,
    wherein if the number of overhead bits added to said minicell is not equal to an integer number of bytes, said overhead adding means is further adapted to add a number of error protection bits for protection of said overhead bits, a sum of said number of error protection bits and said number of overhead bits equaling an integer number of bytes.

6. The data cell generating arrangement according to claim 2,
    wherein said data or speech packet multiplexing means is adapted to receive and multiplex data or speech packets originating from different users into said minicell.

7. The data cell generating arrangement according to claim 2, wherein said data cell is an Asynchronous Transfer Mode cell, and in that said minicells are Asynchronous Transfer Mode Adaptation Layer minicells.

8. The data cell receiving arrangement for receiving a data cell in a telecommunication system, said data cell receiving arrangement comprising:

minicell demultiplexing means adapted to receive said data cell and demultiplex a plurality of minicells multiplexed in said data cell;

overhead extracting means coupled to said minicell demultiplexing means and adapted to subtract from at least one minicell of said plurality of minicells overhead information indicative of the individual lengths of a plurality of data or speech packets multiplexed therein; and packet demultiplexing means coupled to said overhead extracting means and adapted to demultiplex from said at least one minicell said plurality of data or speech packets using said overhead information.

9. A telecommunications system comprising a plurality of network nodes and network links, wherein at least one of said network nodes comprises a data cell generating arrangement comprising:

packet multiplexing means configured to multiplex a plurality of data or speech packets in at least one minicell of a plurality of minicells;

overhead adding means coupled to an output of said packet multiplexing means and configured to add to said at least one minicell overhead information indicative of individual lengths of said data or speech packets multiplexed therein; and minicell multiplexing means coupled to an output of said overhead adding means and configured to multiplex said plurality of minicells into said data cell; and at least one of said network nodes comprises a data cell receiving arrangement comprising:

minicell demultiplexing means adapted to receive said data cell and demultiplex said plurality of minicells multiplexed in said data cell overhead extracting means coupled to said minicell demultiplexing means and adapted to subtract from at least one minicell of said plurality of minicells said overhead information indicative of the individual lengths of a plurality of said data or speech packets multiplexed therein; and packet demultiplexing means coupled to said overhead extracting means and adapted to demultiplex from said at least one minicell said plurality of data or speech packets using said overhead information.

* * * * *